May 6, 1958  R. E. CARBAUH  2,834,008
FLAME DETECTOR SYSTEM
Filed April 28, 1953  2 Sheets-Sheet 2
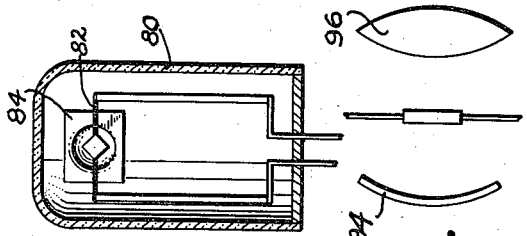
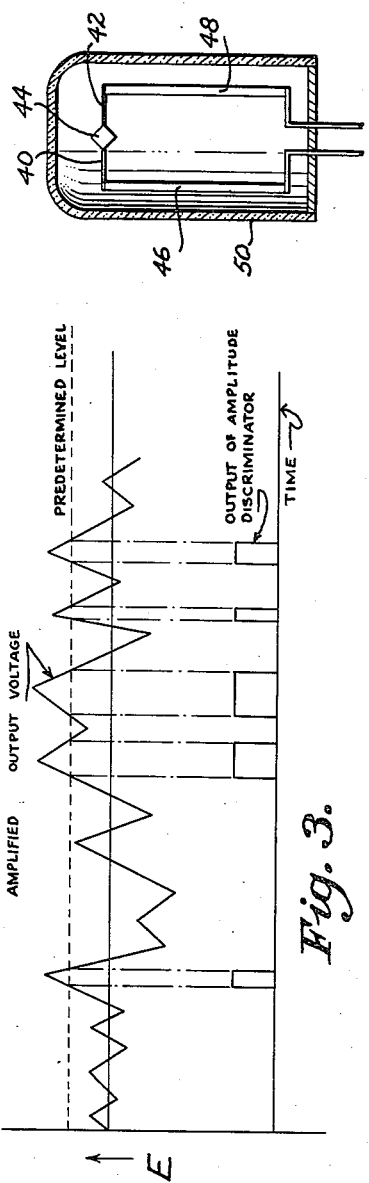
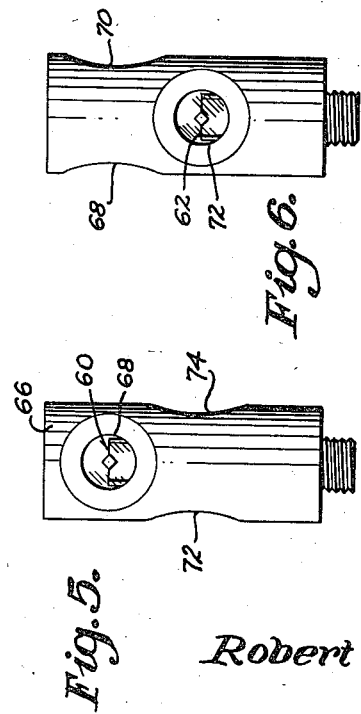
Robert E. Carbauh,
INVENTOR
BY Scrivener & Parker
ATTORNEYS

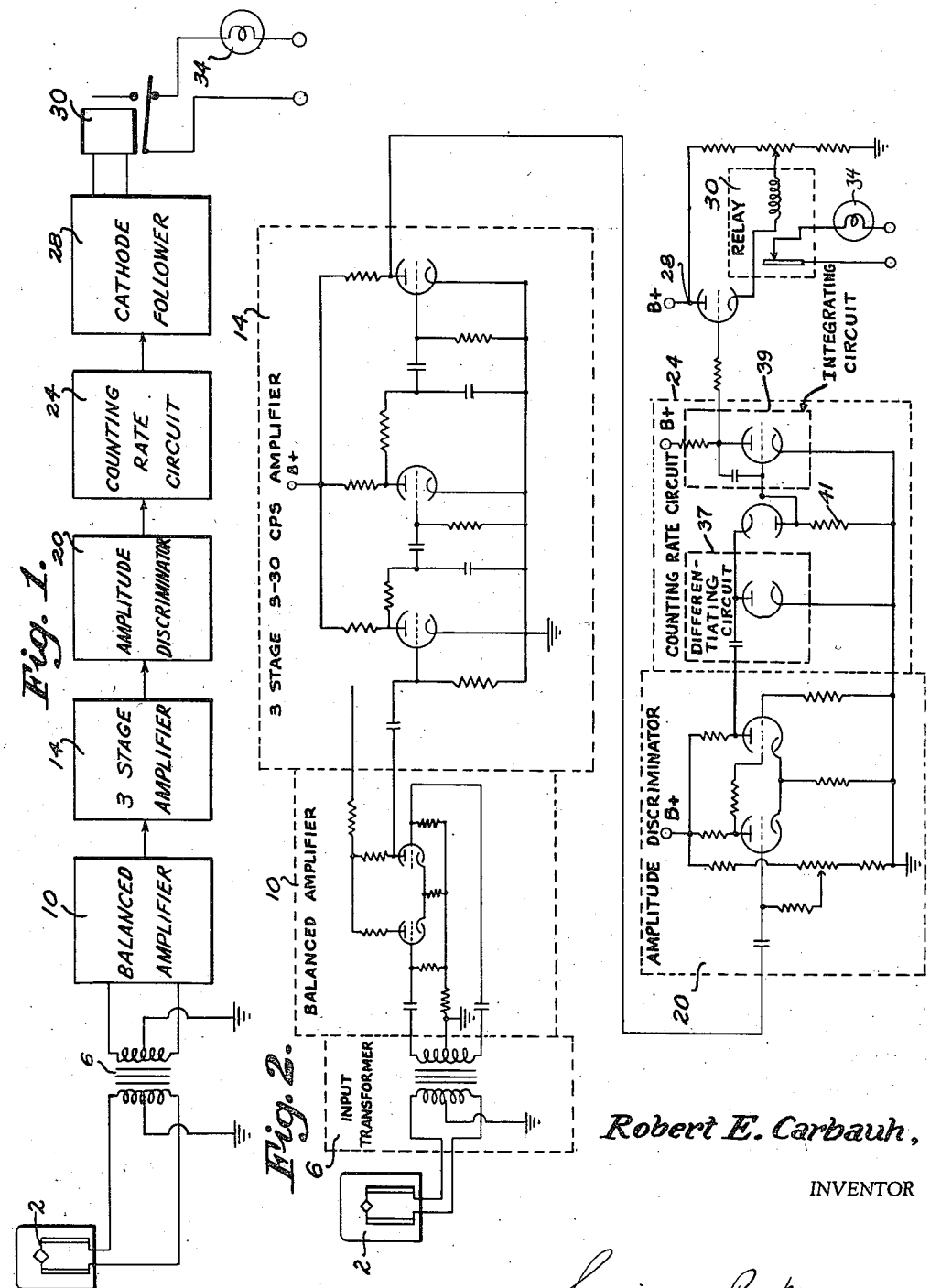

2,834,008

FLAME DETECTOR SYSTEM

Robert E. Carbauh, Medfield, Mass., assignor to Petcar Research Corporation, Belleville, N. J., a corporation of New Jersey Application April 28, 1953, Serial No. 351,632

3 Claims. (Cl. 340—227)

This invention relates broadly to the art of fire detection and, more particularly, to the detection of the existence of infra-red radiation, for example that produced by a flame, as opposed and in contrast to detection systems which are responsive to the existence of a predetermined ambient temperature at the sensitive means of the system. Such detection systems as that to which the invention relates are known as "surveillance type" flame detector systems and may be so referred to in this application.

It has been a principal object of this invention to provide a system for flame detection utilizing a radiation-type thermocouple which will detect and indicate the presence of a flame without being responsive to, or affected by, steady sources of infra-red radiation or elevated ambient temperatures. A further principal object of the invention has been to provide such a system which will be effective to detect the presence of a flame occurring at a substantial distance from the sensitive element of the system and within a wide angular space, preferably 360°, surrounding the element. A further object has been to provide such a system which, after operation to indicate the presence of a flame, will automatically re-set itself after the flame is extinguished, thereby to indicate any succeeding flame.

A preferred means provided by this invention for achieving these objects is described in the following specification and illustrated in the annexed drawings, in which:

Fig. 1 is a block diagram of a system provided by the invention for detection of flame;

Fig. 2 is a circuit diagram of the system shown in Fig. 1;

Fig. 3 illustrates the operation of the amplitude discriminator circuit;

Fig. 4 shows a thermocouple sensing element according to the invention;

Figs. 5 and 6 are views taken at right angles to each other, of a sensing element provided by the invention to monitor throughout 360° about the sensing element;

Fig. 7 is a view showing another embodiment of the invention; and

Figs. 8, 9 and 10 illustrate lens and reflector systems associated with the thermocouple in accordance with the invention.

It has been found that the great majority of "unfriendly" flames, which are those requiring detection, have predominant flicker components within the 3 to 30 C. P. S. range and therefore emit infra-red radiations modulated at a frequency within this range. According to this invention, the infra-red emissions of a flame having flicker components lying within this range are utilized to operate a thermocouple of new construction and operation provided by the invention which receives and immediately dissipates the heat due to each separate pulse of infra-red radiation independent of ambient temperature, thereby producing a pulse of current for each pulse of infra-red radiation. The voltages so produced are amplified and supplied to an amplitude discriminator circuit which produces a voltage pulse when the amplified output of the thermocouple exceeds a predetermined level. A counting rate circuit is connected to the output of the discriminator circuit and counts the rate at which pulses are produced. The output of the counting rate circuit is amplified and fed to a relay which operates an indicating device.

The flame detector system according to this invention, which is shown in block diagram in Fig. 1 and in circuit diagram in Fig. 2, comprises a thermocouple 2 of new form, construction and operation provided by this invention and which is described fully hereinafter. This thermocouple receives infra-red radiations from a source, such as a flame, causing a pulse of voltage to be developed for each flicker of the source.

Voltage pulses produced by the thermocouple must be amplified and means must be provided to distinguish the signal from spurious responses due to hum, pick-up and the like, and sufficient power must be developed to actuate the warning device. The fluctuating signal voltage output of the sensing device is accordingly supplied to the primary winding of a low frequency transformer 6 having a low frequency response of the order of 1.0 C. P. S., the secondary winding of which is connected to a balanced input amplifier stage 10 the output of which is supplied to a high-gain amplifier 14 consisting preferably of three cascaded stages of resistance-coupled amplifiers having a band pass of 3 to 30 C. P. S. Four terminal resistor-capacitor coupling networks are employed to introduce the required frequency response. A slight rise in response is introduced to compensate for the fall-off of response of the thermocouple at the higher frequencies. The amplifier has an approximate gain of 6,000,000 at its mid-band frequency.

To minimize the effect of inherent circuit noise in the amplifier, an amplitude discriminator 20 is introduced at the output of the amplifier. The amplitude discriminator is a cathode-coupled bi-stable multi-vibrator. When the input voltage to the discriminator exceeds a predetermined voltage level which can be determined by adjusting a grid bias control, the multi-vibrator changes from one stable state to the other, returning to the first state only when the input voltage is reduced below the selected level as shown in Fig. 3. Output voltages are produced having a measured amplitude of 80 volts peak to peak. The bias control is set so that inherent circuit noise does not exceed the predetermined level, while the voltage developed due to the presence of a flame exceeds the predetermined level causing a pulse to be developed. Thus the effects of inherent circuit noise and low-level spurious voltages are minimized.

The output waveform from the amplitude discriminator is supplied to a diode counting rate circuit 24 in which a differentiating circuit 37 differentiates the square waveforms received from the amplitude discriminator and causes these square waveforms to be changed to narrow pulses of constant width and amplitude as the RC time constant is relatively small. These pulses charge a Miller-type integrating circuit 39 which is shunted by a high resistance 41. When the rate of occurrence of pulses is low, the charge on the capacitor forming part of the integrating circuit leaks off; however, when the pulse rate is increased the charge on the capacitor does not leak off causing a D. C. voltage to be developed, the amplitude of which is directly proportional to the applied pulse rate. In this manner the effect of low frequency spurious responses are minimized.

The output of the counting-rate circuit is coupled through a cathode follower 28 to a relay 30. As the voltage output of the counting rate circuit is a function of frequency, the relay is adjusted to operate at a predetermined voltage which corresponds to a counting rate of 3 C. P. S. Operation of the relay connects an indicating device 34, such as a lamp, to a source of voltage to energize the indicating device.

The sensing element provided by this invention comprises at least one thermocouple consisting of two wires 40, 42 formed of different metals and connected at their adjacent ends, as by welding, to a target plate 44. As the thermocouple must respond to flame flicker in the range of 3 to 30 C. P. S. the wires 40, 42 and the target plate 44 are made sufficiently small that they will not retain heat due to infra-red radiation from a detected flame, which retention would cause them to arrive at an average temperature, but will lose heat sufficiently rapidly that their temperature will be intermittently increased at the rate of flame flicker. The outer end of each of the thermocouple wires 40, 42 is connected, as by welding, to supporting wires 46, 48, which are formed of a material having high thermal conductivity, such as copper, and which have thermal mass greatly in excess of that of the thermocouple assembly of wires and target plate, thereby permitting the thermocouple assembly to respond to modulated infra-red radiation independent of ambient temperatures. One or both faces of the target plate may be blackened in accordance with known practice in order to increase response. The thermocouple is sealed in an envelope or housing 50 formed of transparent material such as quartz glass and the envelope is evacuated to approximately 10 microns to increase frequency response.

A thermocouple having two wires 40, 42 respectively formed of constantan and Chromel-P each 0.0008 inch in diameter and having a rectangular platinum target plate 1 mm. x 1 mm. on each side and 0.0001 inch thick has been found to dissipate heat sufficiently rapidly to permit response in the 3 to 30 C. P. S. range. Other dimensions and materials may be successfully used but must be selected to permit dissipation of heat sufficiently rapidly to cause response of the thermocouple to each pulse of infra-red radiation due to flame flicker.

A sensing element provided by the invention to give surveillance through 360° about the element is disclosed in Figs. 5 and 6 and comprises two thermocouples 60, 62 arranged at right angles to each other and one above the other, and each being constructed and operable in the manner described hereinbefore. The wires of each thermocouple are connected, as by welding, to supporting wires which have the characteristics described above and which are in turn connected in series with each other and to the input transformer of the amplifier forming part of the complete detector system. The thermocouples may be enclosed in the same or separate envelopes and the assembly is housed in a cylindrical shell 66 which may be formed of stainless steel and which has two upper apertures 68, 70 and two lower apertures 72, 74 which are covered by transparent material such as quartz glass. The two upper apertures are positioned diametrically of the casing 66 and are concentric with each other and with the center of the target plate of the upper thermocouple in order to permit access of a maximum of radiation to the surface of the upper target plate. The two lower apertures are positioned diametrically of the casing 66 and are concentric with each other and with the center of the target plate of the lower thermocouple in order to permit access of a maximum of radiation to the surface of the lower target plate.

Another embodiment of the invention is disclosed in Fig. 7 in which is shown a sensing element comprising an evacuated envelope 80 having within it a thermocouple 82 constructed in the manner described hereinbefore and having, behind the thermocouple a reflector plate 84 which is formed with a spherical depression concentric with the target plate and which focuses the infra-red radiations on the rear face of the target plate, both faces of which are preferably blackened. In this form of the invention the target plate receives radiation on both of its faces.

If desired, the sensing element may be provided with lens systems, reflector systems or combinations of such systems in order to increase the sensitivity of the thermocouple. As examples of such systems, Fig. 8 discloses a reflector system 90 associated with a thermocouple, Fig. 9 discloses a lens system 92 associated with a thermocouple, and Fig. 10 discloses a combined system having the reflector 94 and lens 96 associated with a thermocouple. The thermocouple unit of each of these embodiments of the invention is constructed and operable in the same manner as described above for all thermocouple units provided by the invention.

While we have described and illustrated in this application certain circuits and thermocouple structures, it will be apparent to those skilled in the art that other embodiments, as well as modifications of those disclosed, may be made and practised without departing from the spirit or scope of the invention, for the limits of which reference must be had to the appended claims.

What is claimed is:

1. A surveillance type flame detector system operable to provide an indication in response to an intermittent source of infra-red radiation such as a flame, comprising at least one thermocouple of such small mass that the parts thereof dissipate heat sufficiently rapidly to permit thermocouple response in the range of 3 to 30 C. P. S., means for amplifying the output of the thermocouple, amplitude discriminating means admitting amplified thermocouple signal voltages exceeding a predetermined amplitude and rejecting amplified inherent circuit noise voltages below such predetermined amplitude, means for counting the number of times the amplified thermocouple signal voltage exceeds said predetermined amplitude per unit time, means for producing a voltage proportional to such frequency, indicating means, and means operable by a predetermined voltage produced by the counting means to operate said indicating means.

2. A surveillance type flame detector system operable to provide an indication in response to an intermittent source of infra-red radiation such as a flame, comprising at least one thermocouple of such small mass that the parts thereof dissipate heat sufficiently rapidly to permit thermocouple response in the range of 3 to 30 C. P. S., means for amplifying the output of the thermocouple, means for eliminating all output of the amplifying means of less than a pre-determined amplitude, means for counting the number of times the amplified thermocouple voltage exceeds a peredtermined value per unit time and for producing a voltage proportional to such frequency, indicating means, and means operable by a predetermined voltage produced by the counting means to operate said indicating means.

3. A surveillance type flame detector system according to claim 1, in which the thermocouple comprises aligned wires each approximately 0.0008 inch in diameter and formed of different metals having their adjacent ends connected to a target plate approximately 1 mm. square and 0.0001 inch thick and their outer ends connected to wires of high thermal conductivity which have thermal mass greatly in excess of that of the thermocouple wires and target plate.

References Cited in the file of this patent

UNITED STATES PATENTS

| 1,612,897 | Zethmayr | Jan. 4, 1927 |
| 2,125,113 | Kling | July 26, 1938 |
| 2,233,788 | Lewin | Mar. 4, 1941 |
| 2,507,359 | Weisz | May 9, 1950 |
| 2,533,420 | McFee | May 15, 1951 |
| 2,565,105 | Volochine | Aug. 21, 1951 |
| 2,692,982 | Metcalf | Oct. 26, 1954 |